(12) United States Patent
Takahashi et al.

(10) Patent No.: US 11,750,128 B2
(45) Date of Patent: Sep. 5, 2023

(54) EXTERNAL FORCE ESTIMATION DEVICE, EXTERNAL FORCE ESTIMATION METHOD, AND NON-TRANSITORY COMPUTER-READABLE STORAGE MEDIUM

(71) Applicant: TOYOTA JIDOSHA KABUSHIKI KAISHA, Toyota (JP)

(72) Inventors: Taro Takahashi, Urayasu (JP); Akira Hatano, Toyota (JP); Naoki Mima, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/834,385

(22) Filed: Jun. 7, 2022

(65) Prior Publication Data
US 2022/0416701 A1 Dec. 29, 2022

(30) Foreign Application Priority Data
Jun. 29, 2021 (JP) .................................. 2021-107631

(51) Int. Cl.
*H02P 21/20* (2016.01)
*G01L 3/24* (2006.01)
*H02P 6/17* (2016.01)
*H02P 6/04* (2016.01)

(52) U.S. Cl.
CPC ............... *H02P 21/20* (2016.02); *G01L 3/24* (2013.01); *H02P 6/04* (2013.01); *H02P 6/17* (2016.02); *H02P 2203/03* (2013.01); *H02P 2203/09* (2013.01)

(58) Field of Classification Search
CPC .... H02P 21/20; H02P 6/04; H02P 6/17; H02P 2203/03; H02P 2203/09; H02P 21/143; H02P 29/60; H02P 23/14; G01L 3/24; B25J 9/1653
USPC .................. 318/139, 400.15, 400.01, 700
See application file for complete search history.

(56) References Cited

U.S. PATENT DOCUMENTS 9,122,258 B2 * 9/2015 Sekiguchi ............ G05B 19/406

FOREIGN PATENT DOCUMENTS

JP 2020-035394 A 3/2020

* cited by examiner

*Primary Examiner* — David Luo
(74) *Attorney, Agent, or Firm* — Oliff PLC

(57) ABSTRACT

An external force estimation device is configured to estimate an external force acting on a motor. The external force estimation device includes a processor. The processor is configured to: calculate an output torque of the motor by using a value of a current supplied to the motor; estimate an inertia torque of the motor by using rotational position information of the motor; estimate a first friction torque of the motor by using the rotational position information of the motor; perform temperature-based correction for the first friction torque by using temperature information of the motor; and estimate the external force by subtracting the inertia torque and the first friction torque after the temperature-based correction from the output torque.

8 Claims, 9 Drawing Sheets

EXTERNAL FORCE ESTIMATION DEVICE, EXTERNAL FORCE ESTIMATION METHOD, AND NON-TRANSITORY COMPUTER-READABLE STORAGE MEDIUM

CROSS-REFERENCE TO RELATED APPLICATION

This application claims priority to Japanese Patent Application No. 2021-107631 filed on Jun. 29, 2021, incorporated herein by reference in its entirety.

BACKGROUND

1. Technical Field

The present disclosure relates to an external force estimation device, an external force estimation method, and a non-transitory computer-readable storage medium.

2. Description of Related Art

In a feedback control system, a disturbance observer is used to suppress influence of disturbance and stabilize the control system. For example, Japanese Unexamined Patent Application Publication No. 2020-035394 (JP 2020-035394 A) discloses a disturbance observer configured to estimate disturbance by calculating a torque constant based on temperature information of a motor and estimating a friction torque and an inertia torque due to Coulomb friction and viscous resistance based on position information of the motor.

SUMMARY

To cause the motor to operate a load smoothly, it is necessary to increase the accuracy of motor control. For that purpose, it is necessary to accurately estimate an external force acting on the motor. It is necessary to accurately estimate the external force acting on the motor also for adaptive flexible control depending on the external force. Since the value of the friction torque due to the Coulomb friction and the viscous friction varies depending on temperature, it is difficult to accurately estimate the external force by the method of JP 2020-035394 A using the temperature information only for calculating the torque constant.

The present disclosure provides an external force estimation device, an external force estimation method, and a non-transitory computer-readable storage medium capable of reducing a deviation of an external force to be estimated.

An aspect of the present disclosure relates to an external force estimation device configured to estimate an external force acting on a motor. The external force estimation device includes a processor configured to: calculate an output torque of the motor by using a value of a current supplied to the motor; estimate an inertia torque of the motor by using rotational position information of the motor; estimate a first friction torque of the motor by using the rotational position information of the motor; perform temperature-based correction for the first friction torque by using temperature information of the motor; and estimate the external force by subtracting the inertia torque and the first friction torque after the temperature-based correction from the output torque.

An aspect of the present disclosure relates to an external force estimation method for estimating an external force acting on a motor. The external force estimation method includes: calculating an output torque of the motor by using a value of a current supplied to the motor; estimating an inertia torque of the motor and a friction torque of the motor by using rotational position information of the motor; performing temperature-based correction for the friction torque by using temperature information of the motor; and estimating the external force by subtracting the inertia torque and the friction torque after the temperature-based correction from the output torque.

An aspect of the present disclosure relates to a non-transitory computer-readable storage medium storing a program. When the program is executed by a processor of an external force estimation device configured to estimate an external force acting on a motor, the program causes the external force estimation device to: calculate an output torque of the motor by using a value of a current supplied to the motor; estimate an inertia torque of the motor and a friction torque of the motor by using rotational position information of the motor; perform temperature-based correction for the friction torque by using temperature information of the motor; and estimate the external force by subtracting the inertia torque and the friction torque after the temperature-based correction from the output torque.

The external force estimation device according to the one aspect of the present disclosure performs the temperature-based correction for the friction torque by using the temperature information of the motor. According to the external force estimation device of the one aspect of the present disclosure, the variation in the friction torque along with the temperature change can be corrected, thereby reducing the deviation of the external force to be estimated.

According to the present disclosure, it is possible to provide the external force estimation device, the external force estimation method, and the non-transitory computer-readable storage medium capable of reducing the deviation of the external force to be estimated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
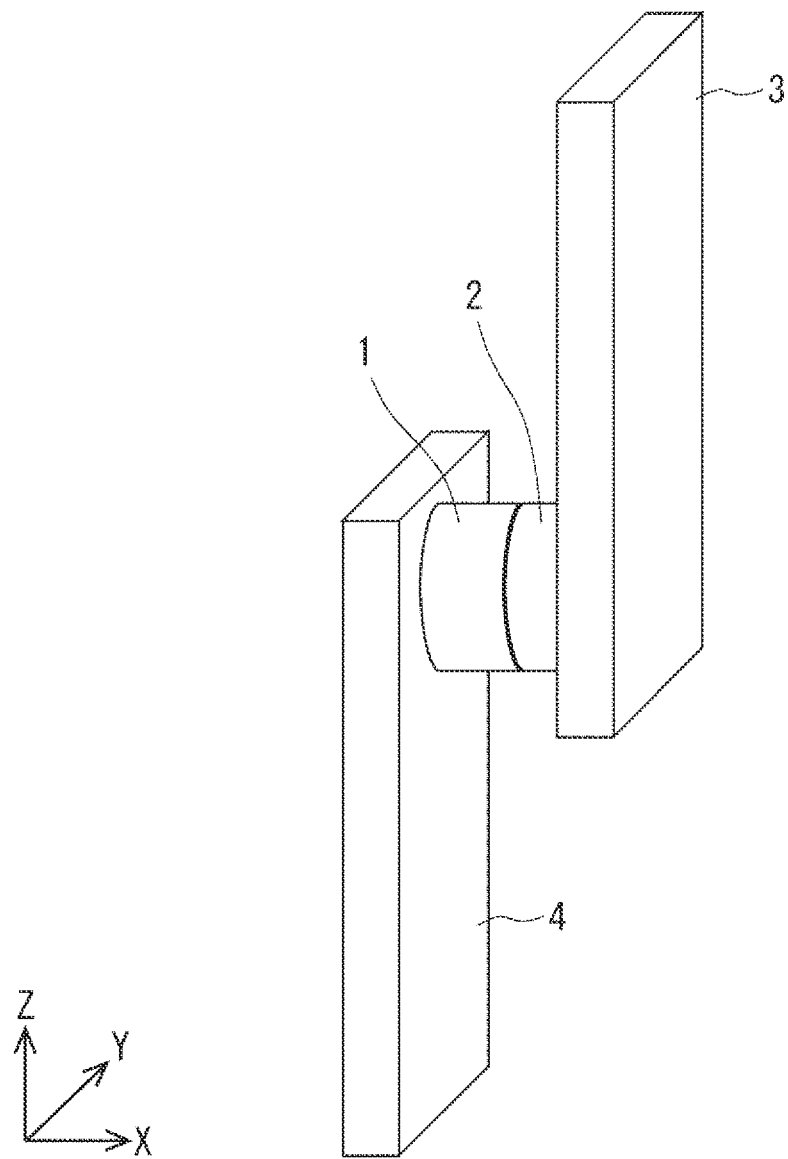
FIG. 1 is a schematic diagram showing the structures of a motor and a load according to a first embodiment.
Figure 6:
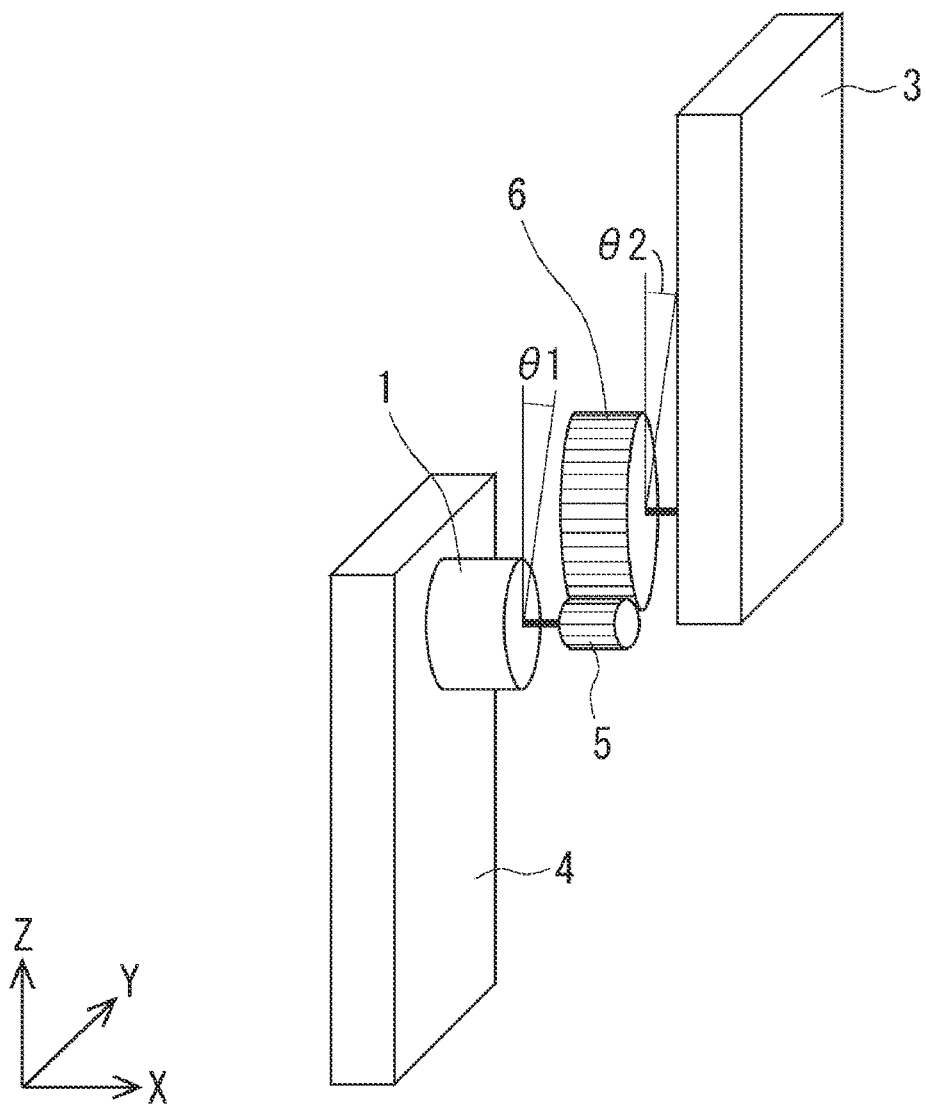
FIG. 6 is a schematic diagram showing the structures of a motor and a load according to a second embodiment.

Hereinafter, specific embodiments to which the present disclosure is applied will be described in detail with reference to the drawings. The present disclosure is not limited to the following embodiments. The following description and the drawings have been simplified as appropriate for clarity. A right-handed xyz orthogonal coordinate system shown in FIGS. 1 and 6 is defined for convenience to describe positional relationships among components. Normally, a positive z-axis direction is a vertically upward direction, and an xy plane is a horizontal plane.

First Embodiment

FIG. 1 is a schematic diagram showing the structures of a motor and a load according to a first embodiment. The structures of the motor and the load are used, for example, in robot joints and the like. In FIG. 1, a motor 1 is coupled to a load 3 via a gear 2. The motor 1 can operate the load 3 via the gear 2. The motor 1 is provided on a fixing portion 4.

The load 3 and the fixing portion 4 are frames that constitute, for example, an arm or leg of a robot. Examples of the load 3 include a frame provided on a tip side of the robot. Examples of the fixing portion 4 include a frame coupled to a body side of the robot. The motor 1 operates based on control of a controller 21 of a control unit 20 described later. Examples of the motor 1 include a servo motor.

Rotational motion of the motor 1 is transmitted to the load 3 via the gear 2. For the sake of simplicity, description will be given below about a case where the position of the fixing portion 4 is fixed. The position of the fixing portion 4 may be changed along with the operation of the robot.

The load 3 rotates on a yz plane. When the rotation direction of the motor 1 is changed, the movement direction (rotation direction) of the load 3 is changed. The load 3 can be operated in an arbitrary direction or at an arbitrary rotation speed (angular velocity) by changing the number of the gears 2 and the size of the gear 2. The movement speed of the load 3 changes depending on the rotation speed of the motor 1. Specifically, the movement speed of the load 3 increases as the rotation speed of the motor 1 increases. Similarly, the movement speed of the load 3 decreases as the rotation speed of the motor 1 decreases.

Figure 2:
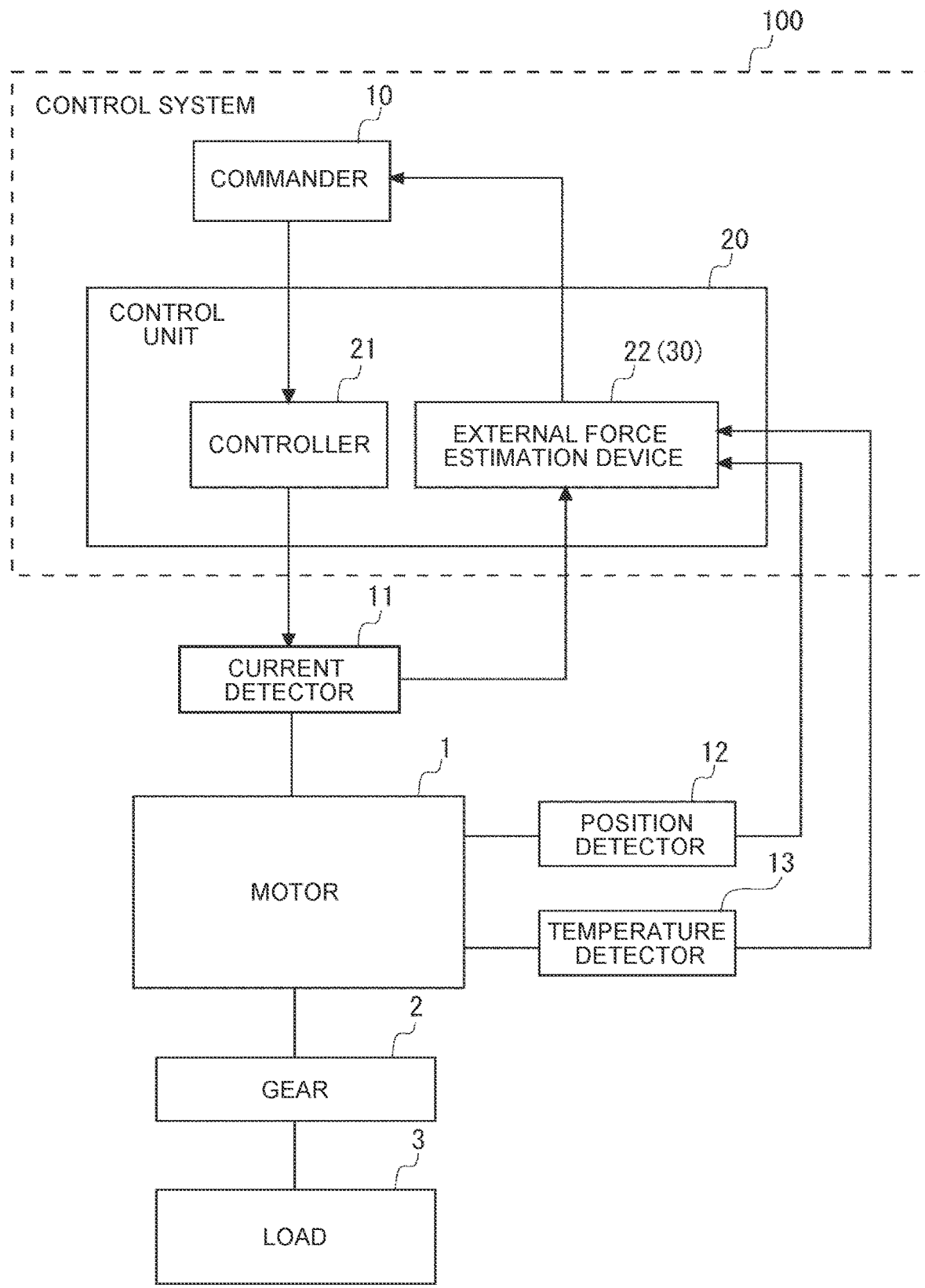
FIG. 2 is a diagram showing an example of the overall configuration of a control system according to the first embodiment.

FIG. 2 is a diagram showing the overall configuration of a control system 100 according to the first embodiment. The control system 100 shown in FIG. 2 is used to control the motor 1. The control system 100 includes a commander 10 and a control unit 20. Examples of the commander 10 and the control unit 20 include a computer device. Processes related to the commander 10 and the control unit 20 may be executed by different computer devices. As described with reference to FIG. 1, the motor 1 operates the load 3 via the gear 2. The motor 1 is provided with a current detector 11, a position detector 12, and a temperature detector 13. The control system 100 may have other components necessary for operation.

The commander 10 issues a command to the control unit 20 to control the motor 1. The control unit 20 controls the motor 1 based on the command from the commander 10. A plurality of control units 20 may be provided, for example, on joints of arms and legs of the robot. That is, the control unit 20 may be provided for each motor that operates each joint. In this case, the commander 10 can control motions of a plurality of joints of the robot by issuing commands to the control units 20 to control the motors.

The control unit 20 includes a controller 21 and an external force estimation device 22. The controller 21 controls the motor 1 based on a command from the commander 10 to control the motor 1. The external force estimation device 22 estimates an external force acting on the motor. Examples of the controller 21 and the external force estimation device 22 include a computer device. Processes related to the controller 21 and the external force estimation device 22 may be executed by different computer devices.

The external force estimation device 22 is connected to the current detector 11, the position detector 12, and the temperature detector 13. The external force estimation device 22 estimates the external force acting on the motor 1 by using a current value of the motor 1 that is acquired from the current detector 11, rotational position information of the motor 1 that is acquired from the position detector 12, and temperature information of the motor 1 that is acquired from the temperature detector 13. The external force is a force (reaction force) related to the load 3 and acts on the motor 1 via the load 3. The external force estimation device 22 outputs the estimated external force to the commander 10. When a plurality of control units 20 is provided, a plurality of external force estimation devices 22 outputs external forces estimated by the external force estimation devices 22 to the commander 10. A detailed configuration of the external force estimation device 22 will be described later.

The current detector 11 is a device that detects a value of a current supplied to the motor 1. Examples of the current detector 11 include a current sensor. The current detector 11 can be provided at an arbitrary position where the current of the motor 1 can be detected. The current value acquired by the current detector 11 is input to the external force estimation device 22.

The position detector 12 is a device that detects a rotational position of the motor 1. Examples of the position detector 12 include an encoder provided on the motor 1. An angular velocity of the motor 1, an angular acceleration of the motor 1, and a rotation angle of the motor 1 can be calculated from the rotational position information of the motor 1. The rotational position information acquired by the position detector 12 is input to the external force estimation device 22.

The temperature detector 13 is a device that detects a temperature of the motor 1. Examples of the temperature detector 13 include a temperature sensor. The temperature detector 13 can be provided at an arbitrary position where the temperature of the motor 1 can be detected. The temperature information acquired by the temperature detector 13 is input to the external force estimation device 22.

The commander 10 controls the motor 1 via the controller 21 by using the external force estimated by the external force estimation device 22. As a result, the commander 10 can improve the accuracy of the motor control, and the load 3 can be operated smoothly. For example, the commander 10 can realize a smooth motion of the load 3 by operating the load 3 in a direction in which influence of the external force is canceled by using a direction of the external force estimated by the external force estimation device 22. The commander 10 can realize an adaptive flexible motion depending on the external force on the load 3 by increasing a movement speed or a movement acceleration of the load 3 in the direction of the external force based on the magnitude of the external force estimated by the external force estimation device 22. The commander 10 may control a plurality of motors to realize smooth motions of all the loads by using a plurality of external forces estimated by a plurality of external force estimation devices 22 provided in a plurality of control units 20.

Figure 3:
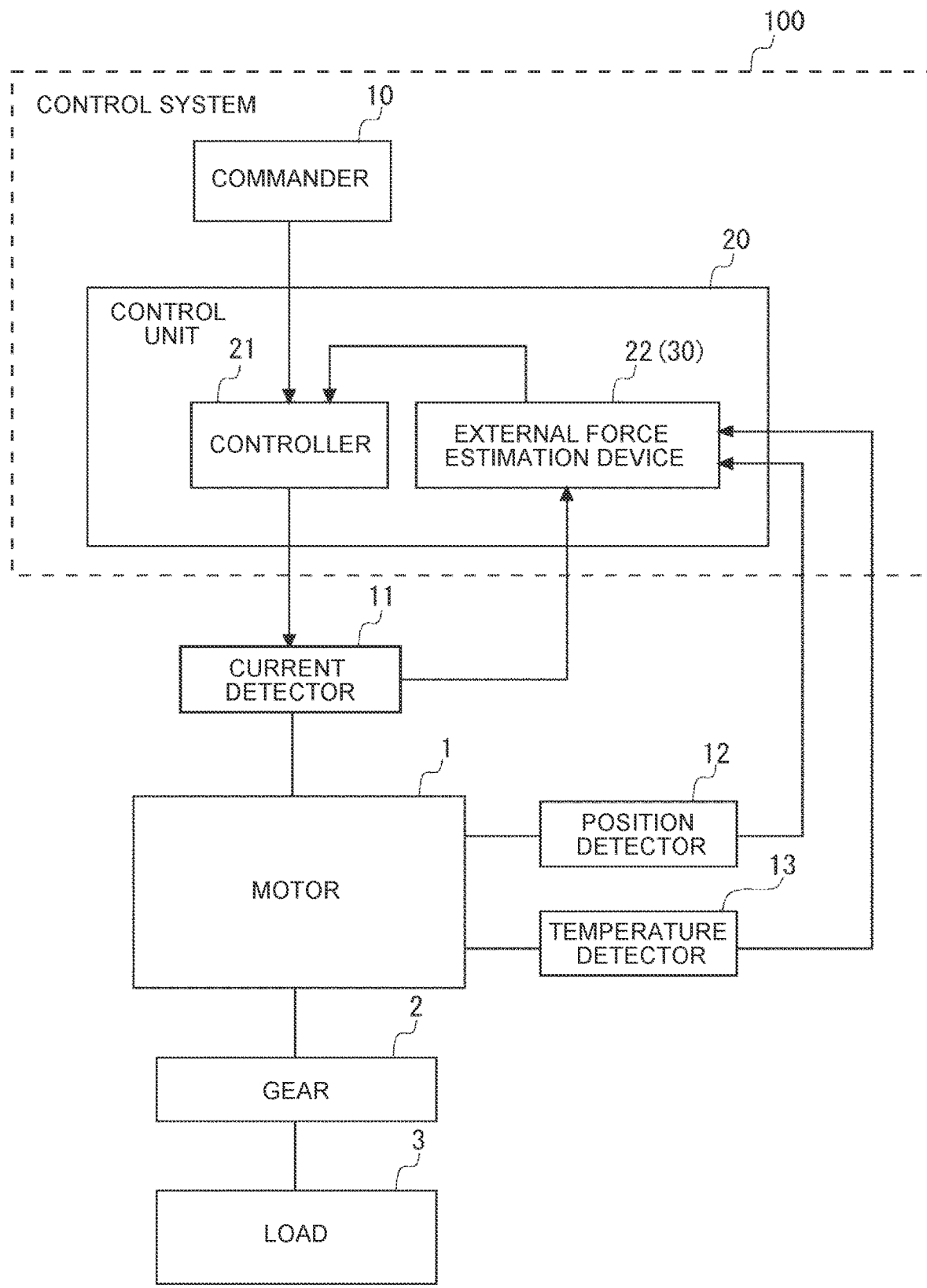
FIG. 3 is a diagram showing an example of the overall configuration of the control system according to the first embodiment.

As shown in FIG. 3, the external force estimation device 22 may output the estimated external force to the controller 21. The controller 21 may realize the smooth motion of the load 3 by acquiring the external force estimated by the external force estimation device 22 and operating the load 3 in the direction in which the influence of the external force is canceled by using the direction of the acquired external force based on the command from the commander 10. The controller 21 may realize the adaptive flexible motion depending on the external force on the load 3 by increasing the movement speed or the movement acceleration of the load 3 in the direction of the external force based on the magnitude of the external force acquired from the external force estimation device 22. The external force estimation device 22 may output the estimated external force both to the commander 10 and to the controller 21.

Configuration of External Force Estimation Device

Figure 4:
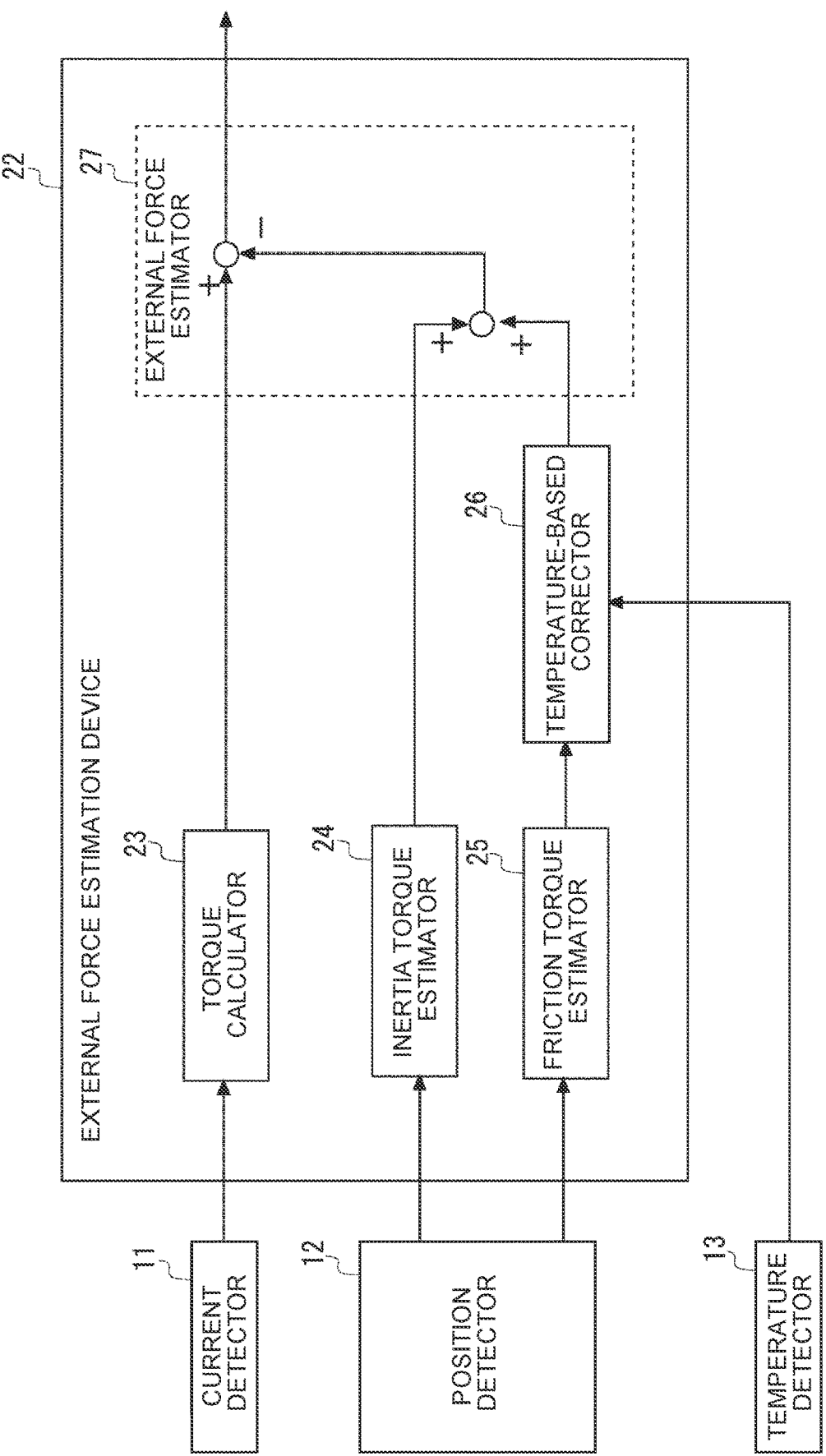
FIG. 4 is a diagram showing the configuration of an external force estimation device according to the first embodiment.

FIG. 4 is a block diagram showing the configuration of the external force estimation device 22 according to the first embodiment. The external force estimation device 22 includes a torque calculator 23, an inertia torque estimator 24, a friction torque estimator 25, a temperature-based corrector 26, and an external force estimator 27. The external force estimation device 22 may have other components necessary for operation.

The torque calculator 23 calculates an output torque of the motor 1 by using a value of the current supplied to the motor 1. The torque calculator 23 acquires a current value detected by the current detector 11 and calculates the output torque of the motor 1 by determining a product of the current value and a torque constant of the motor 1.

The inertia torque estimator 24 estimates an inertia torque of the motor 1 by using rotational position information of the motor 1. Specifically, the inertia torque estimator 24 can estimate the inertia torque by deriving an angular acceleration of the motor 1 from the rotational position information of the motor 1 and determining a product of the angular acceleration and a moment of inertia of the motor 1. The moment of inertia can be calculated by measuring, for a plurality of angular accelerations, output torques of the motor 1 when the motor 1 is rotating at constant angular accelerations, respectively, and deriving a proportional relationship between the angular acceleration and the output torque. The moment of inertia may be calculated by using a value calculated from a design drawing of the load.

The inertia torque estimator 24 may estimate the inertia torque of the motor 1 by using a result of inverse dynamics calculation. The inverse dynamics calculation is a method of calculating a torque required to operate a load from an angular velocity and an angular acceleration.

The friction torque estimator 25 estimates a friction torque of the motor 1 by using rotational position information of the motor 1. Hereinafter, a method for estimating the friction torque will be described. When the angular velocity of the motor 1 is constant and no external force is applied, the motor output torque and the friction torque are equal to each other. The friction torque varies depending on the rotation speed of the motor 1. Therefore, a motor output torque, that is, a friction torque at a predetermined rotation speed of the motor 1 can be derived by calculating an average of current values for one rotation of the load 3 at a constant speed and multiplying the current values by the torque constant. A friction torque value associated with a speed change can be obtained by acquiring the current value while changing the rotation speed of the motor 1. The friction torque estimator 25 can estimate the friction torque at the rotation speed of the motor 1 based on the rotation speed calculated from the rotational position information of the motor 1 and a correspondence between the friction torque and the rotation speed of the motor 1 that is derived in advance.

The friction torque may include at least one of a Coulomb friction torque and a viscous friction torque. The friction torque estimator 25 can estimate the Coulomb friction torque and the viscous friction torque by using the angular velocity calculated from the rotational position information of the motor 1. Specifically, the friction torque estimator 25 can derive the Coulomb friction torque and the viscous friction torque by deriving the Coulomb friction torque and a viscous friction coefficient from two steady states and multiplying the viscous friction coefficient by the angular velocity of the target motor 1. The steady state is a state in which the angular velocity of the motor 1 is constant.

The temperature-based corrector 26 performs temperature-based correction for the friction torque by using the temperature information of the motor 1. The temperature-based corrector 26 derives a correspondence between a predetermined temperature and the friction torque. The temperature-based corrector 26 performs the temperature-based correction for the friction torque estimated by the friction torque estimator 25 by using the correspondence and a temperature indicated by the temperature information acquired by the temperature detector 13.

For example, a correspondence between a current value at a first rotation speed and a temperature change is derived by rotating the motor 1 at the first rotation speed in a no-load state and measuring the current value while changing the temperature. Next, a correspondence between a current value at a second rotation speed different from the first rotation speed and the temperature change is derived by rotating the motor 1 at the second rotation speed and measuring the current value while changing the temperature.

Since two points at the predetermined temperature that are the relationship between the first rotation speed and the current value and the relationship between the second rotation speed and the current value are determined, a correspondence between the rotation speed and the current value of the motor 1 at the predetermined temperature can be determined by using these two points. The friction torque estimator 25 can estimate a friction torque before temperature-based correction from the rotation speed of the motor 1. The product of the current value at the predetermined temperature and the torque constant of the motor 1 is a value of the friction torque based on the temperature change.

From the above, the temperature-based corrector 26 can perform the temperature-based correction by using the following linear expression that approximates a relationship between the friction torque before temperature-based correction and the friction torque after temperature-based correction at the predetermined temperature.

$$y=ax+b \qquad \text{Math. 1}$$

y: Friction torque after temperature-based correction
x: Friction torque before temperature-based correction
a: Coefficient at predetermined temperature
b: Coefficient at predetermined temperature For example, when the temperature detected by the temperature detector 13 is a first temperature, the temperature-based corrector 26 can estimate the friction torque after temperature-based correction by substituting, for x, the friction torque before temperature-based correction that is estimated by the friction torque estimator 25 in an expression "$y=a_1x+b_1$" at the first temperature ($a_1$ and $b_1$ are coefficients at the first temperature).

Similarly, when the temperature detected by the temperature detector 13 is a second temperature, the temperature-based corrector 26 can estimate the friction torque after temperature-based correction by substituting, for x, the friction torque before temperature-based correction that is estimated by the friction torque estimator 25 in a correspondence "$y=a_2x+b_2$" at the second temperature ($a_2$ and $b_2$ are coefficients at the second temperature). Even at temperatures other than the first temperature and the second temperature, the coefficients can be determined by, for example, polynomial interpolation from the correspondence between the temperature change and the current value measured while changing the temperature as described above. Although the temperature-based corrector 26 described above corrects the friction torque based on the temperature, the effect of the correction based on the temperature may be included in the friction torque estimator 25 to calculate and use the friction torque that changes depending on the temperature. This is because, when the friction torque is expressed as the Coulomb friction torque or the viscous friction torque, the Coulomb friction or the viscosity coefficient changes depending on the temperature.

As described above, the temperature-based corrector 26 can perform the temperature-based correction for the friction torque by using the temperature information acquired by the temperature detector 13.

The external force estimator 27 estimates the external force by subtracting the inertia torque and the friction torque after temperature-based correction from the output torque calculated by the torque calculator 23. The external force estimator 27 outputs the estimated external force to the commander 10.

As described above, the external force estimation device 22 according to the first embodiment can correct the variation in the friction torque due to the temperature change, thereby reducing a deviation of the external force to be estimated. According to the external force estimation device 22 of the first embodiment, the accuracy of the motor control can be improved.

In the external force estimation device 22 according to the first embodiment shown in FIG. 2, the estimated external force is output to the commander 10 at a stage higher than that of the controller 21. The commander 10 can control the motor 1 via the control unit 20 based on the direction and magnitude of the external force, thereby smoothly operating the load 3.

When the load 3 operates at an acceleration close to zero or when the inertia of the load 3 is sufficiently small, influence of the inertia torque is extremely small. Therefore, the external force estimator 27 may estimate the external force with the inertia torque value set to zero.

External Force Estimation Method

Figure 5:
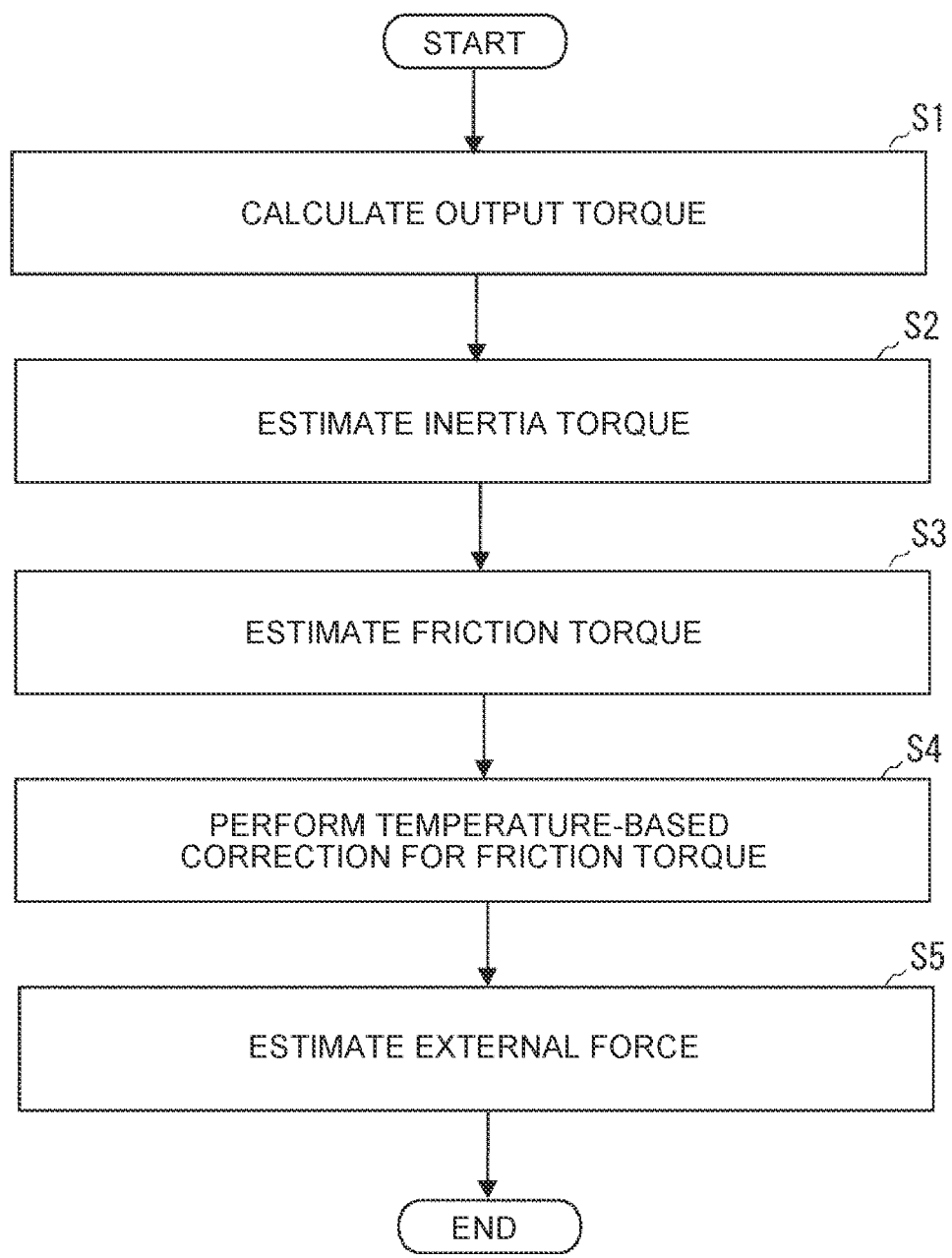
FIG. 5 is a flowchart showing an operation of the external force estimation device according to the first embodiment.

An external force estimation method according to the first embodiment will be described with reference to FIG. 5. FIG. 5 is a flowchart showing an operation of the external force estimation device 22 according to the first embodiment.

The torque calculator 23 calculates an output torque of the motor 1 by using a current value of the motor 1 that is acquired by the current detector 11 (Step S1). The inertia torque estimator 24 estimates an inertia torque of the motor 1 by using rotational position information of the motor 1 that is acquired by the position detector 12 (Step S2). As described above, the inertia torque estimator 24 may estimate the inertia torque of the motor 1 by using a result of the inverse dynamics calculation. As a result, influence of gravity, centrifugal force, and Coriolis force can be taken into consideration, and the accuracy is further improved.

The friction torque estimator 25 estimates a friction torque from the rotational position information acquired from the position detector 12 (Step S3). The temperature-based corrector 26 performs the temperature-based correction for the friction torque estimated by the friction torque estimator 25 by using temperature information acquired by the temperature detector 13 (Step S4). The temperature-based correction can be performed by the method described above.

The external force estimator 27 estimates an external force by subtracting the inertia torque estimated by the inertia torque estimator 24 and the friction torque after temperature-based correction from the output torque calculated by the torque calculator 23 (Step S5). Then, the external force estimator 27 outputs the estimated external force to the commander 10. The order of Steps S1 to S3 is not limited to this order and may be arbitrary order.

As described above, the external force estimation device 22 according to the first embodiment can correct the variation in the friction torque due to the temperature change, thereby reducing the deviation of the estimated external force. According to the external force estimation device 22 of the first embodiment, the accuracy of the motor control can be improved and the load can be operated smoothly.

Second Embodiment

FIG. 6 is a schematic diagram showing the structures of a motor and a load according to a second embodiment. The structure of the gear is shown in detail as compared with that in FIG. 1. The motor 1 operates the load 3 via gears 5 and 6. Although the number of gears is two in FIG. 6 for the sake of simplicity, the number and the sizes of the gears to be provided as the gears 5 and 6 may be set arbitrarily.

A rotation angle $\Theta 1$ of the motor 1 is an angle in the rotation direction of the motor 1. A rotation angle $\Theta 2$ of the load 3 is an angle in the rotation direction of the load 3. The rotation angle $\Theta 1$ of the motor 1 is detected by the position detector 12 provided on the motor 1. The rotation angle $\Theta 2$ of the load 3 can be determined from a gear ratio and the rotation angle $\Theta 1$ of the motor 1 that is detected by the position detector 12. A position detector may further be provided on the load 3 to detect the rotation angle $\Theta 2$ of the load 3.

Configuration of External Force Estimation Device

Figure 7:
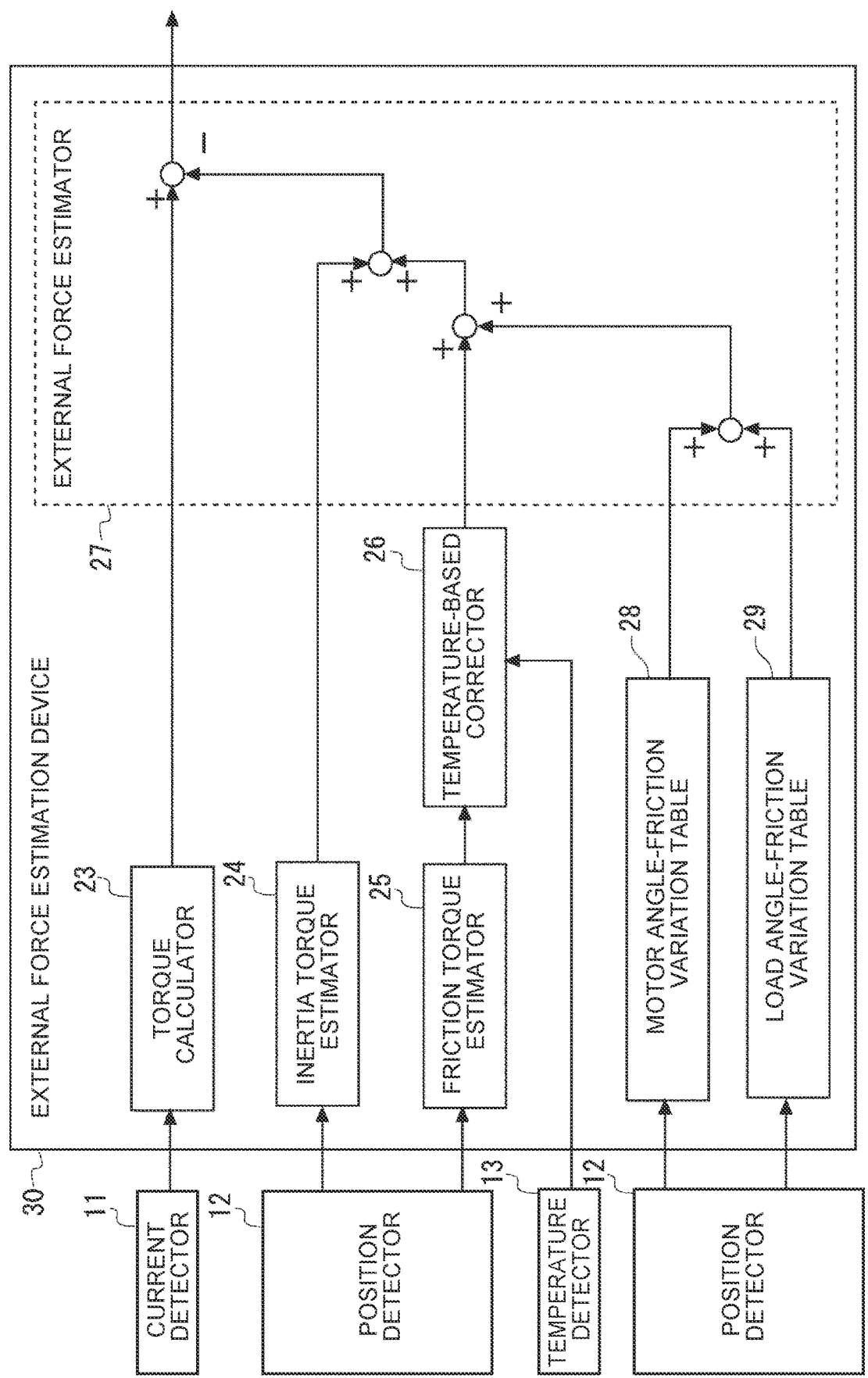
FIG. 7 is a diagram showing the configuration of an external force estimation device according to the second embodiment.

FIG. 7 is a block diagram showing the configuration of an external force estimation device 30 according to the second embodiment. The external force estimation device 30 according to the second embodiment includes the torque calculator 23, the inertia torque estimator 24, the friction torque estimator 25, the temperature-based corrector 26, the external force estimator 27, a motor angle-friction variation table 28, and a load angle-friction variation table 29. In the external force estimation device 30 according to the second embodiment, the motor angle-friction variation table 28 and the load angle-friction variation table 29 are added as compared with the external force estimation device 22 according to the first embodiment. In the external force estimation device 30 according to the second embodiment, the same components as those of the external force estimation device 22 according to the first embodiment are represented by the same reference numerals, and detailed description thereof will be omitted as appropriate.

The motor angle-friction variation table 28 is a table that stores a correspondence between the rotation angle $\Theta 1$ of the motor 1 and a friction torque that varies depending on the rotation angle $\Theta 1$. That is, the motor angle-friction variation table 28 stores values for the variation in the friction torque depending on the rotation angle $\Theta 1$ of the motor 1.

The motor angle-friction variation table 28 can be created by acquiring current values for one rotation of the motor 1, defining split sections based on the rotation angle $\Theta 1$ of the motor 1, averaging current values in the split sections, averaging the current values for one rotation as a whole, subtracting the average of the current values for one rotation as a whole from the average of the current values in the split sections, and multiplying a result of the subtraction by the torque constant.

Table 1 is an example of the motor angle-friction variation table 28.

TABLE 1

| | Motor rotation angle [rad] | | | | | | | | | |
|---|---|---|---|---|---|---|---|---|---|---|
| | 0.00 | 0.33 | 0.66 | 0.99 | 1.32 | 1.66 | 1.99 | 2.32 | 2.65 | 2.98 |
| Friction torque [N · m] | 0.01 | −0.09 | 0.11 | −0.07 | −0.03 | 0.21 | −0.04 | −0.11 | 0.12 | −0.10 |
| | Motor rotation angle [rad] | | | | | | | | | |
| | 3.31 | 3.64 | 3.97 | 4.30 | 4.63 | 4.97 | 5.30 | 5.63 | 5.96 | |
| Friction torque [N · m] | 0.01 | −0.07 | −0.02 | 0.20 | −0.05 | −0.07 | 0.20 | −0.09 | −0.11 | |

By using the motor angle-friction variation table 28, a friction torque associated with the rotation angle Θ1 of the motor 1 is estimated. The external force estimator 27 can estimate the external force by subtracting the inertia torque, the friction torque after temperature-based correction, and the friction torque estimated by using the motor angle-friction variation table 28 from the output torque calculated by the torque calculator 23. By using the motor angle-friction variation table 28, the external force estimation device 30 can compensate for influence of the friction torque that depends on the rotation angle Θ1 of the motor 1, thereby reducing the deviation in the estimation of the external force.

The load angle-friction variation table 29 is a table that stores a correspondence between the rotation angle Θ2 of the load 3 and a friction torque that varies depending on the rotation angle Θ2. That is, the load angle-friction variation table 29 stores values for the variation in the friction torque depending on the rotation angle Θ2 of the load 3.

The load angle-friction variation table 29 can be created by acquiring current values for one rotation of the load 3, defining split sections based on the rotation angle Θ2 of the load 3, averaging current values in the split sections, averaging the current values for one rotation as a whole, subtracting the average of the current values for one rotation as a whole from the average of the current values in the split sections, and multiplying a result of the subtraction by the torque constant.

Table 2 is an example of the load angle-friction variation table 29.

TABLE 2

| | Load rotation angle [rad] | | | | | | | | | |
|---|---|---|---|---|---|---|---|---|---|---|
| | 0.00 | 0.33 | 0.66 | 0.99 | 1.32 | 1.66 | 1.99 | 2.32 | 2.65 | 2.98 |
| Friction torque [N · m] | 0.000 | 0.017 | 0.007 | −0.005 | −0.011 | −0.010 | −0.006 | −0.003 | −0.006 | −0.003 |
| | Load rotation angle [rad] | | | | | | | | | |
| | 3.31 | 3.64 | 3.97 | 4.30 | 4.63 | 4.97 | 5.30 | 5.63 | 5.96 | |
| Friction torque [N · m] | 0.011 | −0.005 | 0.000 | −0.005 | 0.000 | 0.009 | 0.002 | −0.004 | 0.011 | |

By using the load angle-friction variation table 29, the external force estimation device 30 can estimate a friction torque associated with the rotation angle Θ2 of the load 3. The external force estimator 27 can estimate the external force by subtracting the inertia torque, the friction torque after temperature-based correction, and the friction torque estimated by using the load angle-friction variation table 29 from the output torque calculated by the torque calculator 23. By using the load angle-friction variation table 29, the external force estimation device 30 can compensate for influence of the friction torque that depends on the rotation angle Θ2 of the load 3, thereby reducing the deviation in the estimation of the external force.

The external force estimator 27 may estimate the external force by subtracting the inertia torque, the friction torque after temperature-based correction, the friction torque estimated by using the motor angle-friction variation table 28, and the friction torque estimated by using the load angle-friction variation table 29 from the output torque calculated by the torque calculator 23. By using the motor angle-friction variation table 28 and the load angle-friction variation table 29, the external force estimation device 30 can compensate for the influence of the friction torque that depends on the rotation angle Θ1 of the motor 1 and the influence of the friction torque that depends on the rotation angle Θ2 of the load 3, thereby further reducing the deviation in the estimation of the external force.

External Force Estimation Method

Figure 8:
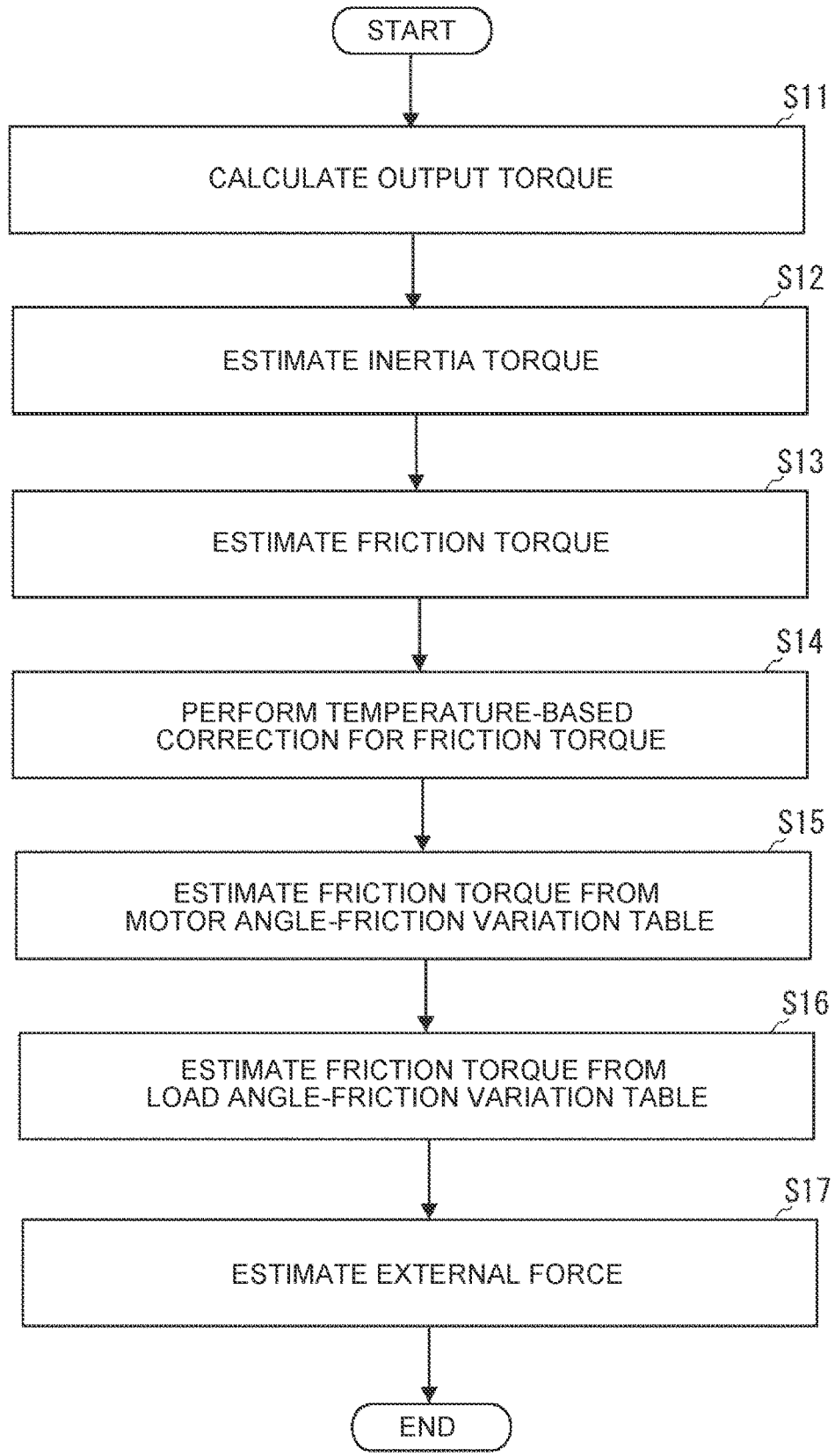
FIG. 8 is a flowchart showing an operation of the external force estimation device according to the second embodiment.

An external force estimation method according to the second embodiment will be described with reference to FIG. 8. FIG. 8 is a flowchart showing an operation of the external force estimation device 30 according to the second embodiment. Steps S1 to S14 in FIG. 8 are the same as Steps S1 to S4 in FIG. 5. Therefore, description thereof will be omitted.

A friction torque is estimated by using the rotation angle Θ1 of the motor 1 that is acquired by the position detector 12 and the motor angle-friction variation table 28 (Step S15). A friction torque is estimated by using the load angle-friction variation table 29 and the rotation angle Θ2 of the load 3 that is calculated from the gear ratio and the rotation angle Θ1 of the motor 1 (Step S16). The order of Steps S15 and S16 is not limited to this order and may be arbitrary order.

The external force estimator 27 estimates an external force by subtracting the inertia torque, the friction torque after temperature-based correction, the friction torque estimated by using the motor angle-friction variation table 28, and the friction torque estimated by using the load angle-friction variation table 29 from the output torque calculated by the torque calculator 23 (Step S17). The external force estimator 27 outputs the estimated external force to the commander 10.

As described above, the external force estimation device 30 according to the second embodiment can not only correct the variation in the friction torque due to the temperature change but also estimate the external force based on the influence of the friction torque that depends on the rotation angle Θ1 of the motor 1 and the rotation angle Θ2 of the load 3. Thus, the external force estimation device 30 according to the second embodiment can reduce the deviation of the estimated external force and increase the accuracy of the estimated value of the external force acting on the motor 1. According to the external force estimation device 30 of the second embodiment, the accuracy of the motor control can be improved and the load can be operated smoothly.

By using the motor angle-friction variation table 28, the external force estimation device 30 according to the second embodiment can reduce influence of a cogging torque due to the rotation angle Θ1 of the motor 1, thereby collectively compensating for the cogging torque that generally exists at about 5% in a rated output torque of the motor.

Figure 9:
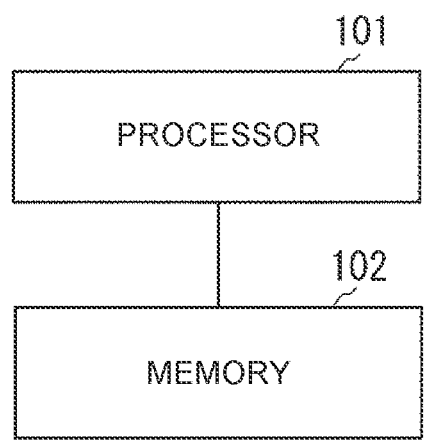
FIG. 9 is a diagram showing an example of the hardware configuration of a control unit according to the first and second embodiments.

An example of the hardware configuration of the control unit 20 according to the first and second embodiments will be described with reference to FIG. 9. The commander 10 may also have the same hardware configuration as that of the control unit 20. Further, the controller 21, the external force estimation device 22, and the external force estimation device 30 may have the hardware configuration shown in FIG. 9. In FIG. 9, the control unit 20 includes a processor 101 and a memory 102. Examples of the processor 101 include a microprocessor, a micro-processing unit (MPU), and a central processing unit (CPU). The processor 101 may include a plurality of processors. The memory 102 is composed of a combination of a volatile memory and a non-volatile memory. The memory 102 may include a storage arranged away from the processor 101. In this case, the processor 101 may access the memory 102 via an input/output interface (not shown).

Each device in the embodiments described above is composed of hardware and/or software, and may be composed of one hardware or software product or a plurality of hardware or software products. The function (process) of each device in the embodiments described above may be implemented by a computer. For example, a program for performing the operation in the embodiments may be stored in the memory 102, and each function may be implemented by the processor 101 executing the program stored in the memory 102.

The program according to the embodiments is an external force estimation program for estimating an external force acting on the motor. The external force estimation program causes a computer to execute the process of calculating an output torque of the motor by using a value of the current supplied to the motor, estimating an inertia torque of the motor and a friction torque of the motor by using the rotational position information of the motor, performing the temperature-based correction for the estimated friction torque by using the temperature information of the motor, and estimating an external force by subtracting the inertia torque and the friction torque after temperature-based correction from the calculated output torque.

The program includes a set of instructions (or software code) for causing the computer to perform one or more of the functions described in the embodiments when loaded into the computer. The program may be stored in a non-transitory computer-readable medium or a tangible storage medium. Examples of the computer-readable medium or the tangible storage medium include, but are not limited to, a random-access memory (RAM), a read-only memory (ROM), a flash memory, a solid-state drive (SSD) or other memory technologies, a compact disk read-only memory (CD-ROM), a digital versatile disk (DVD), a Blu-ray (registered trademark) disk or other optical disk storages, a magnetic cassette, a magnetic tape, a magnetic disk storage, or other magnetic storage devices. The program may be transmitted on a transitory computer-readable medium or a communication medium. Examples of the transitory computer-readable medium or the communication medium include, but are not limited to, an electrical, optical, acoustic, or other form of propagating signal.

The external force estimation device 22 and the external force estimation device 30 according to the embodiments are applicable not only to robots such as partner robots, collaborative robots, assist robots, and service robots, but also to a sensorless power steering technology in automobiles, automatic opening/closing doors, and the like.

The present disclosure is not limited to the embodiments described above, and may be modified as appropriate without departing from the spirit.

What is claimed is:

1. An external force estimation device configured to estimate an external force acting on a motor, the external force estimation device comprising a processor configured to:
   calculate an output torque of the motor by using a value of a current supplied to the motor;
   estimate an inertia torque of the motor by using rotational position information of the motor;
   estimate a first friction torque of the motor by using the rotational position information of the motor;
   perform temperature-based correction for the first friction torque by using temperature information of the motor; and
   estimate the external force by subtracting the inertia torque and the first friction torque after the temperature-based correction from the output torque.

2. The external force estimation device according to claim 1, wherein the first friction torque includes at least one of a Coulomb friction torque and a viscous friction torque.

3. The external force estimation device according to claim 1, wherein the processor is configured to estimate the inertia torque of the motor by using a result of inverse dynamics calculation.

4. The external force estimation device according to claim 1, wherein:
   the motor is configured to operate a load via a gear; and
   the processor is configured to:
      estimate a second friction torque that varies depending on a rotation angle of the motor based on a correspondence between the rotation angle of the motor and the second friction torque; and
      estimate the external force by subtracting the inertia torque, the first friction torque after the temperature-based correction, and the second friction torque from the output torque.

5. The external force estimation device according to claim 1, wherein:
   the motor is configured to operate a load via a gear; and
   the processor is configured to:
      estimate a third friction torque that varies depending on a rotation angle of the load based on a correspondence between the rotation angle of the load and the third friction torque; and
      estimate the external force by subtracting the inertia torque, the first friction torque after the temperature-based correction, and the third friction torque from the output torque.

6. The external force estimation device according to claim 1, wherein:
   the motor is configured to operate a load via a gear; and
   the processor is configured to:

estimate a second friction torque that varies depending on a rotation angle of the motor based on a correspondence between the rotation angle of the motor and the second friction torque;

estimate a third friction torque that varies depending on a rotation angle of the load based on a correspondence between the rotation angle of the load and the third friction torque; and estimate the external force by subtracting the inertia torque, the first friction torque after the temperature-based correction, the second friction torque, and the third friction torque from the output torque.

7. An external force estimation method for estimating an external force acting on a motor, the external force estimation method comprising:

calculating an output torque of the motor by using a value of a current supplied to the motor;

estimating an inertia torque of the motor and a friction torque of the motor by using rotational position information of the motor;

performing temperature-based correction for the friction torque by using temperature information of the motor; and estimating the external force by subtracting the inertia torque and the friction torque after the temperature-based correction from the output torque.

8. A non-transitory computer-readable storage medium storing a program that, when executed by a processor of an external force estimation device configured to estimate an external force acting on a motor, causes the external force estimation device to:

calculate an output torque of the motor by using a value of a current supplied to the motor;

estimate an inertia torque of the motor and a friction torque of the motor by using rotational position information of the motor;

perform temperature-based correction for the friction torque by using temperature information of the motor; and estimate the external force by subtracting the inertia torque and the friction torque after the temperature-based correction from the output torque.

* * * * *